United States Patent [19]

Hino et al.

[11] Patent Number: 4,905,311
[45] Date of Patent: Feb. 27, 1990

[54] OPTICAL SURFACE ROUGHNESS MEASURING APPARATUS WITH POLARIZATION DETECTION

[75] Inventors: Motohito Hino, Nagoya; Yoshinori Bessho, Mie; Michio Kondo, Nagoya, all of Japan

[73] Assignee: Brother Kogyo Kabushiki Kaisha, Aichi, Japan

[21] Appl. No.: 307,303

[22] Filed: Feb. 7, 1989

[30] Foreign Application Priority Data

Feb. 10, 1988 [JP] Japan ................................. 63-29312
Feb. 12, 1988 [JP] Japan ................................. 63-31584

[51] Int. Cl.$^4$ ............................................. G02F 1/01
[52] U.S. Cl. ..................................... 250/225; 356/369
[58] Field of Search ...................... 250/225, 571, 572; 356/371, 365, 369, 370

[56] References Cited

U.S. PATENT DOCUMENTS 4,668,860  5/1987  Anthon ............................. 356/369
4,672,196  6/1987  Canino ............................. 250/225

Primary Examiner—David C. Nelms
Attorney, Agent, or Firm—Oliff & Berridge

[57] ABSTRACT

An optical surface roughness measuring device for measuring roughness of a surface of a subject in a non-contacting manner. The apparatus includes a laser device for producing two linearly polarized laser beams which has mutually perpendicular polarization planes and different frequencies, and an optical device adapted to receive the two linearly polarized beams, converge one of the two laser beams so as to irradiate a first reading spot on the surface of the subject, convert the other of the two laser beams into parallel rays of light, and irradiate a second reading spot on the surface with the parallel rays of light of the other laser beam such that the second reading spot is aligned with the first reading spot and has a diameter sufficiently larger than that of the first reading spot. The surface roughness is measured based on a detected change in a beat frequency of the two laser beams reflected by the first and second reading spots. Alternatively, the two beams may be converged by a converging lens device at two spaced-apart points of the subject surface. In this case, an optical device includes an arrangement for establishing an angle of inclination between the directions of incidence of the two beams upon the converging lens device.

14 Claims, 5 Drawing Sheets

OPTICAL SURFACE ROUGHNESS MEASURING APPARATUS WITH POLARIZATION DETECTION

BACKGROUND OF THE INVENTION

1. Field of the Invention

The present invention relates to an optical apparatus for measuring roughness of a surface of a subject.

2. Discussion of the Prior Art

In an example of a presently available optical surface roughness measuring apparatus, a subject is mounted on a rotary table rotatably supported by an air bearing, and areas of the surface of the subject are irradiated by two linearly polarized beams which are produced by a common laser source. Described more particularly, the two linearly polarized laser beams have mutually perpendicular polarization planes and different frequencies fs and fp, and are referred to as S-type and P-type linearly polarized beams. These S-type and P-type beams are converged by a Wollaston polarizing prism, at a first and a second point of convergence on the subject surface, respectively. The first convergence point is aligned with the axis of rotation of the subject, and the second convergence point is located adjacent to the first convergence point. The S-type and P-type linearly polarized laser beams reflected by the first and second convergence points on the subject surface have respective frequencies of fs+Δfs, and fp+ Δfp. With these reflected laser beams received by suitable photosensor means, a measuring beat signal having a beat frequency of fs−fp+Δfs−Δfp is obtained. An amount of displacement Zp of the subject surface at the second convergence point is obtained by integrating phase shift amounts of the measuring beat signal according to the following equation, provided that Δfs is substantially zero, that is, the surface roughness at the first convergence point is zero (namely, a portion of the subject surface at the first convergence point or axis of rotation of the subject is mirror-smooth):

$$Zp = \lambda/2 \int \Delta fp \, dt = \lambda/2 \int (fd - fb) \, dt = \lambda/2 \, (Cd - Cb)$$

where,
fd: Measuring beat signal
fb: Reference beat signal
Cd: Count of pulses of the measuring beat signal
Cb: Count of pulses of the reference beat signal As described above, the above-described known optical surface roughness measuring apparatus requires the subject surface to have complete mirror-smoothness in an extremely small area around the axis of rotation of the subject, which mirror-smooth area is irradiated by the S-type linearly polarized beam. Usually, the subject to be measured does not have such a mirror-smooth area. Further, the use of a member having such a mirror-smooth surface area around the axis of rotation of the subject, makes it difficult or impossible to effect optical measurement of the subject surface.

Another disadvantage of the known optical surface roughness measuring apparatus arises from the use of a Wollaston polarizing prism for separating the S-type and P-type linearly polarized beams so that the two beams are converged at the first and second spaced-apart convergence points. Generally, the Wollaston polarizing prism is not suitable for controlling the optical paths of the S-type and P-type linearly polarized beams such that the points of convergence of the two beams are spaced apart from each other by only a small distance, for example, by a distance of a few microns. Accordingly, a precession movement or oscillation of the subject is likely to increase a measuring error of the apparatus.

Furthermore, the known apparatus using a rotary table permits only the measurement of roughness of a circumferential portion of the subject surface, and therefore makes it difficult to process optical roughness data for providing a three-dimensional display of the measured surface roughness of the subject.

SUMMARY OF THE INVENTION

It is accordingly an object of the present invention to provide an optical surface roughness measuring apparatus which permits accurate and easy measurement of roughness of a surface of a subject, without using a rotary table and a Wollaston polarizing prism.

The above object may be achieved according to one aspect of the present invention, which provides an optical surface roughness measuring device for measuring roughness of a surface of a subject in a non-contacting manner, by irradiating the surface with two linearly polarized beams of light which have mutually perpendicular polarization planes and different frequencies, and detecting a change in a beat frequency of the two beams reflected by the surface, the measuring apparatus comprising a laser device for producing two linearly polarized laser beams as the two linearly polarized beams, and an optical device receiving the two linearly polarized beams. The optical device is adapted to converge one of the two laser beams so as to irradiate a first reading spot on the surface of the subject, convert the other of the two laser beams into parallel rays of light, and irradiate a second reading spot on the surface with the parallel rays of light of the other laser beam, such that the second reading spot is aligned with the first reading spot and has a diameter sufficiently larger than that of the first reading spot.

In the optical surface roughness measuring apparatus according to the aspect of the invention described above, the two linearly polarized laser beams having the mutually perpendicular polarization planes and different frequencies are produced by the laser device, and one of the two laser beams are converged by the optical device, so as to irradiate the first reading spot on the subject surface. The other laser beam is converted into the parallel rays with which the second reading spot aligned with the first reading spot is irradiated. Since the above-indicated other laser beam irradiating the second reading spot consists of the parallel rays of light, the diameter of the second reading spot is sufficiently greater than that of the first reading spot. By combining the two linearly polarized laser beams reflected by the first and second reading spots, there is obtained a measuring beat signal having a beat frequency of the frequencies of the two reflected laser beams. The measuring beat signal undergoes a phase shift corresponding to a change in the relative surface height between the first and second reading spot. Thus, the roughness of the subject surface may be measured by detecting the amounts of change in the frequency shift and phase shift of the measuring beat signal.

The instant optical surface roughness measuring apparatus does not require the subject surface to have a completely mirror smooth area as provided around the axis of rotation of a subject in the known apparatus described above. Thus, the instant apparatus permits more accurate and easier measurement of the surface roughness of the subject.

Further, the instant measuring apparatus eliminates a Wollaston polarizing prism for separating the two linearly polarized beams which have the mutually perpendicular polarization planes and different frequencies. Namely, the optical device used in the present invention enables the two laser beams to be converged at the mutually aligned first and second reading spots on the subject surface. Accordingly, the adverse influence of vibration or oscillation of the subject on the measuring accuracy is kept to a minimum. For instance, even when the measurement is effected with the subject rotated by a rotary table, the amount of measuring error due to the precession movement of the subject is considerably reduced.

In addition, the elimination of the requirement to use a rotary table permits the measurement of the subject surface while the subject is moved in a two-axis cooperate system or in an X-Y plane with an X-Y table. In this case, it is easy to process optical roughness data for providing a three-dimensional display of the measured surface roughness of the subject.

In the instant measuring apparatus wherein the second reading spot irradiated by the above-indicated other laser beam has a relatively large area, the frequency of the relevant other laser beam reflected by the second reading spot does not involve an influence of the roughness of the comparatively large second reading spot, since different surface height values in the local areas of the large second reading spots are counterbalanced by each other. Therefore, the frequency shift of the laser beam reflected by the second reading spot is caused by only an influence of disturbances such as a Doppler shift. However, this influence is counterbalanced by a similar influence included in the laser beam reflected by the first reading spot. Thus, the instant measuring apparatus assures accurate measurement of the surface roughness of the subject.

The laser device may be an He-Ne laser source which produces two laser beams having mutually perpendicular planes of wave vibrations and different frequencies.

In one form of the above aspect of the invention, the optical device includes: a first polarizing laser beam splitter for separating the two laser beams from each other; first converging lens means for converting said one of the two laser beam into parallel rays of light; second converging lens means for converging said other laser beam; a second polarizing laser beam splitter receiving the parallel rays of light of said one laser beam and the converged other laser beam; and an objective lens for converging the parallel rays of light of said one laser beam so as to irradiate the first reading spot, and converting the converged other laser beam into parallel rays of light so as to irradiate the second reading spot.

In another form of the present invention, the measuring apparatus comprises: a reference photosensor receiving the two linearly polarized laser beams from the laser device, and producing a reference beat signal; a measuring photosensor receiving the two laser beams reflected by the surface of the subject, and producing a measuring beat signal; and a detecting circuit receiving the reference and measuring beat signals, and calculating the roughness of the subject based on the received beat signals.

In one arrangement of the above form of the invention, the detecting circuit calculates a first amount of displacement of the surface of the subject at the first reading spot during a movement of the subject in a direction perpendicular to a direction of the displacement, based on a difference between counts of pulses of the reference and measuring beat signals. The first amount is calculated in increments of a half of a wavelength of the frequencies of the laser beams. The detecting circuit further calculates a second amount of displacement of the surface during the movement, based on a count of clock pulses for a time duration corresponding to a phase difference between the reference and measuring beat signals. The second amount of displacement is calculated in increments of not larger than the half of the wavelength. The detecting circuit is adapted to add the first and second amounts of displacement, thereby eventually determining the roughness of the surface of the subject, based on a sum of the first and second amounts. The subject may be moved in an X-Y plane, relative to the optical device, by an X-Y table on which the subject is mounted. In this case, the first and second displacements of the subject surface occurring in a Z-axis direction perpendicular to the X-Y plane, as the subject is moved in the X-Y plane with the X-Y table.

According to another aspect of the invention, there is also provided an optical surface roughness measuring apparatus for measuring roughness of a surface of a subject in a non-contacting manner, by irradiating the surface with two linearly polarized beams of light which have mutually perpendicular polarization planes and different frequencies, and detecting a change in a beat frequency of the two beams reflected by the surface, the measuring apparatus comprising: a laser device for producing two linearly polarized laser beams as the two linearly polarized beams; a converging lens device for converging the two laser beams at a first and a second point of convergence on the surface of the subject; a polarizing beam splitter disposed between an optical path between the laser device and the converging lens device, and having a reflector surface which permits transmission therethrough of a linearly polarized beam having a polarization plane parallel to a plane of incidence thereof, and which reflects a linearly polarized beam having a polarization plane perpendicular to the plane of incidence, the polarizing beam splitter causing one of the two laser beams to be incident upon the converging lens device and converged by the converging lens device at the first point of convergence, the polarizing beam splitter causing the other of the two laser beams to deviate from the optical path; and optical means for causing said other laser beam which has deviated from the optical path, to be again incident upon the polarizing beam splitter and emitted from the beam splitter such that said other laser beam is incident upon the converging lens means and thereby converged at the second point of convergence, such that a direction of incidence of said other laser beam upon the converging lens device is inclined by a predetermined angle with respect to that of said one laser beam, so that the second point of convergence is spaced by a small distance away from the first point of convergence.

In the optical surface roughness measuring apparatus according to the above aspect of the present invention, the two linearly polarized laser beams which are produced by the laser device and have the mutually perpendicular polarization planes and different frequencies are separated from each other by the polarizing beam splitter, such that on of the two laser beams is incident upon the converging lens device and converged by the lens device at the first point of convergence, while the other laser beam deviates from the optical path. The above-indicated other laser beam is received by the optical means, which causes the received laser beam to be again incident upon the polarizing beam splitter and incident upon the converging lens device such that the direction of incidence of said other laser beam upon the lens device is inclined with respect to that of said one laser beam so that the first and second points of convergence of the two laser beams are located adjacent to each other.

The optical surface roughness measuring apparatus according to the above aspect of the invention provides substantially the same advantages of the measuring apparatus according to the above-described one aspect of the invention, except for the feature associated with the first and second reading spots of the preceding aspect of the invention.

In this aspect of the invention, too, the laser device may be an He-Ne laser source which produces two laser beams having mutually perpendicular planes of wave vibrations and different frequencies.

In one form of the above aspect of the invention, the optical means comprises: a first mirror reflecting said other laser beam reflected from the polarizing beam splitter, in a direction toward the beam splitter; a first ¼ waveplate disposed between the beam splitter and the first mirror, for rotating the polarization plane of said other laser beam to be rotated by 90 degrees, so that said other laser beam can be transmitted through the beam splitter; a second mirror for reflecting said other laser beam transmitted through the beam splitter, in a direction toward the beam splitter; a second ¼ waveplate disposed between the beam splitter and the second mirror, for rotating the polarization plane of said other laser beam by 90 degrees, so that said other laser beam can be reflected by the beam splitter, and wherein the second mirror is inclined relative to the optical path so that the direction of incidence of said other laser beam upon the converging lens device is inclined by the predetermined angle with respect to that of said one laser beam.

In another form of the same aspect of the invention, the optical means comprises a first rectangular prism for reflecting said other laser beam from the polarizing beam splitter, in a direction parallel to a direction in which said other laser beam was reflected by the beam splitter toward the first rectangular prism, and a second rectangular prism for reflecting sait other laser beam reflected from the first rectangular prism, in a direction toward the beam splitter, and wherein the second rectangular prism is inclined relative to the optical path so that the direction of incidence of said other laser beam upon the converging lens device is inclined by the predetermined angle with respect to that of said one laser beam.

In a further form of the same aspect of the invention, the optical means comprises a first mirror for reflecting said other laser beam transmitted through the polarizing beam splitter away from the optical path, and a second mirror for reflecting said other laser beam reflected from the first mirror, so that said other laser beam is transmitted through the beam splitter and incident upon the converging lens device so that the direction of incidence of said other laser beam upon the converging lens device is inclined by the predetermined angle with respect to that of said one laser beam.

The instant measuring apparatus may further comprise a reference photosensor receiving the two linearly polarized laser beams from the laser device, and producing a reference beat signal, a measuring photosensor receiving the two laser beams reflected by the surface of the subject, and producing a measuring beat signal, and a detecting circuit receiving the reference and measuring beat signals. The detecting circuit calculates the roughness of the subject based on the received beat signals. The detecting circuit may be adapted to calculate a first amount of displacement of the surface of the subject at the first reading spot during a movement of the subject in a direction perpendicular to a direction of the displacement, based on a difference between counts of pulses of the reference and measuring beat signals. The first amount is calculated in increments of a half of a wavelength of the frequencies of the laser beams. The detecting circuit further calculates a second amount of displacement of the surface during the movement, based on a count of clock pulses for a time duration corresponding to a phase difference between the reference and measuring beat signals. The second amount of displacement is calculated in increments of not larger than the half of the wavelength. The detecting circuit adds the first and second amounts of displacement, to eventually determine the roughness of the surface of the subject, based on a sum of the first and second amounts.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
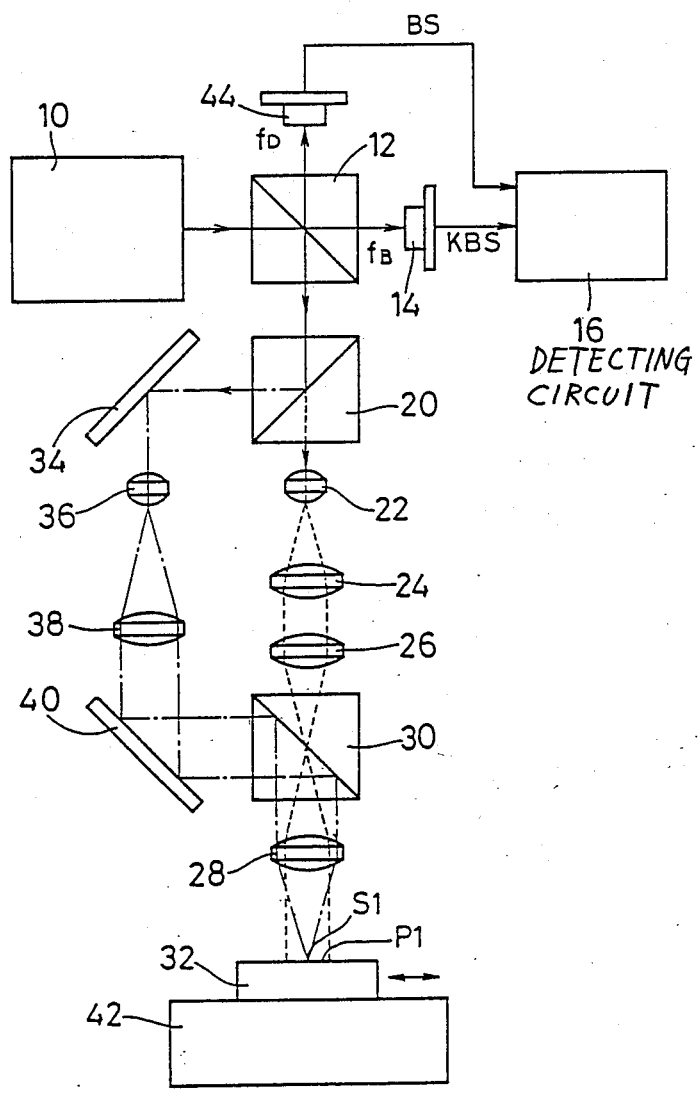
FIG. 1 is a schematic view of one embodiment of an optical surface roughness measuring apparatus of the present invention.

Referring first to FIG. 1, reference numeral 10 denotes a Zeeman type He-Ne laser source which produces two linearly polarized beams of laser light which have mutually perpendicular planes of polarization or wave vibrations and different frequencies. The two laser beams may consist of, for example, an S-type linearly polarized laser beam having a frequency fs, and a P-type linearly polarized laser beam having a frequency fp. These two linearly polarized laser beams are split by a non-polarizing beam splitter 12. Namely, a component of each of the S-type and P-type linearly polarized laser beams is reflected by the non-polarizing beam splitter 12, while the other component of each laser beam is transmitted through the beam splitter 12, and received and detected by a reference photosensor 14. This reference photosensor 14 produces a reference beat signal KBS having a beat frequency fB (=fs−fp) of the frequencies of the received two laser beams. The reference beat signal is received by a detecting circuit 16.

The S-type and P-type linearly polarized laser beams reflected by the non-polarizing beam splitter 12 are split by a polarizing beam splitter 20. Described more specifically, the P-type polarized laser beam which has the polarization plane parallel to the plane of incidence of the beam splitter 20 is transmitted through the beam splitter 20, while the S-type polarized laser beam having the polarization plane perpendicular to the plane of incidence is reflected by the beam splitter 20, in a direction perpendicular to the direction of incidence. As indicated in one-dot chain line in FIG. 1, the S-type polarized laser beam reflected by the beam splitter 20 is reflected by a mirror 34, and converted into parallel rays of light by converging lenses 36, 38. Then, the S-type polarized laser beam is reflected by a mirror 40 and a polarizing beam splitter 30, and converged by an objective lens 28 at a point of convergence S1 on the surface of a subject 32. Namely, a reading spot S1 having an extremely small diameter is irradiated by the S-type laser beam.

The optical path of the P-type linearly polarized laser beam which has been transmitted through the polarizing beam splitter 20 is indicated in dashed line in FIG. 1. That is, the P-type laser beam transmitted through the beam splitter 20 is converted by converging lenses 22, 4 into parallel rays, which are once converged by a converging lens 26 at a front focal point of the objective lens 28. The converged P-type laser beam is again converted into parallel rays by the objective lens 28, while being transmitted through the polarizing beam splitter 30. Thus, the parallel rays of the P-type laser beam are propagated along the same optical axis as the S-type laser beam, and irradiate a reading spot P1 on the surface of the subject 2, which is aligned with the center of the reading spot S1 of the S-type laser beam. Since the reading spot P1 is irradiated by the parallel rays of the P-type linearly polarized laser beam, the diameter of the reading spot P1 is sufficiently larger than that of the reading spot S1 (point of convergence S1).

In the present embodiment, the S-type linearly polarized beam serves as a measuring beam, while the P-type linearly polarized laser beam serves as a reference beam. However, the S-type and P-type laser beams serve as the reference and measuring beams, respectively. The Zeeman-type He-Ne laser source 10 serves as a laser device for producing two linearly polarized laser beams having mutually perpendicular polarization planes. Further, the polarizing beam splitters 20, 30, converging lenses 22, 24, 26, 36, 38 and mirrors 34, 40 constitute an optical device which is adapted to irradiate the reading spot S1 on the surface of the subject 32 with an S-type linearly polarized laser beam, and irradiate the reading spot P1 on the same surface with a P-type linearly polarized laser beam, such that the diameter of the reading spot P1 is considerably larger than that of the reading spot S1.

The subject 32 is mounted on an X-Y table 42 which is moved by a suitable drive device in an X-Y coordinate plane, along mutually perpendicular X and Y axes.

The P-type and S-type linearly polarized laser beams which are reflected by the surface of the subject 32 are propagated back to the polarizing beam splitter 20, in the reverse direction along the same optical paths as described above. The P-type and S-type laser beams combined with each other by the beam splitter 20 are incident upon a measuring photosensor 44 through the non-polarizing beam splitter 44. The measuring photosensor 44 produces a measuring beat signal BS having a beat frequency of the frequency of the S-type laser beam reflected by the reading spot S1 and the frequency of the P-type laser beam reflected by the reading spot P1. The produced measuring beat signal BS is applied to the detecting circuit 16.

Since the reading spot P1 has a considerably large area, the frequency of the P-type polarized laser beam (reference beam) reflected by the reading spot P1 is subject to substantially no influence of the roughness of the surface of the subject 32, and is influenced only by disturbances or noises such as a disturbance caused by vertical vibrations of the X-Y table 42. That is, the frequency of the reflected P-type laser beam includes a Doppler shift $\Delta fd$ due to the disturbances. On the other hand, the frequency of the S-type polarized laser beam (measuring beam) reflected by the extremely small reading spot S1 includes both a Doppler shift $\Delta fs$ caused by X-Y movements of the subject 32, and a Doppler shift $\Delta fd$ caused by the disturbances. Suppose the nominal frequencies of the S-type and P-type laser beams as produced by the laser source 10 are represented by fs and fp, respectively, a reference beat frequency fB represented by the reference beat signal KBS is equal to (fs−fp), while a measuring beat frequency fD represented by the measuring beat signal BS is equal to ($|fs-fp+\Delta fs|$), with the two amounts of Doppler shifts $\Delta fd$ received by the photosensor 44 being counterbalanced with each other.

The detecting circuit 16, which receives the measuring and reference beat signals BS, KBS, produces a beat signal having a beat frequency $\Delta fs = (fD - fB)$, which is indicative of the roughness of the surface of the subject 32. For instance, an amount of displacement Zsl of the subject surface in the Z-axis or vertical direction at the reading spot S1 during movement of the subject 32 in the X-Y plane, which corresponds to the roughness of local areas of the surface of the subject 32, may be obtained according to the following equation (1), by subtracting a count $C_B$ of pulses of the reference beat signal BS, from a count $C_I$ of pulses of the measuring beat signal BS:

$$Zs1 = (\lambda/2) \int \Delta fs \, dt \qquad (1)$$
$$= (\lambda/2) \Sigma [C_I - C_B]$$

Where the degree of the surface roughness is smaller than a half ($\lambda/2$) of the wavelength $\lambda$ of the laser beams, an amount of Z-axis displacement Zs2 of the surface of the subject 32 at the reading spot S1 during movement of the subject 32 may be measured with a resolution or in increments of about $\lambda/2000$ resolution, by a clock counter which counts clock pulses of the measuring and reference beat signals BS and KBS, whose phase difference is in the neighborhood of 100 MHz. Namely, the beat frequency $\Delta fs$ indicated above is represented by the following equation (2), according to the basic formula of the Doppler effect:

$$\Delta fs = (2/\lambda) \cdot (\Delta Zs / \Delta t) \qquad (2)$$

By integrating the equation (2), the amount of Z-axis displacement Zs2 at the reading spot S1 in the Z-axis direction may be obtained according to the following equation (3):

$$Zs2 = (\lambda/2) \int \Delta fs \, dt \qquad (3)$$

The detecting circuit 16 calculates the surface roughness of the subject 32, by adding the displacement Zs2 in increments of not larger than λ/2, and the displacement Zs1 inincrements of λ/2.

It follows from the foregoing description that the S-type and P-type linearly polarized laser beams having mutually perpendicular polarization planes and different frequencies are emitted to irradiate the beat spots S1 and P1 on the surface of the subject 32, without using a Wollaston polarizing prism for splitting two linearly polarized beams having mutually perpendicular polarization planes and different frequencies. Accordingly, the instant optical surface roughness measuring apparatus is substantially free from influences of vibrations or oscillation of the X-Y table 42, and eliminates a rotary table which is supported by an air bearing. Even where such a rotary table is used, the apparatus is free from an influence of a precession movement of the subject mounted on the rotary table.

Further, the instant embodiment does not require that a portion of the surface of a subject have substantially 100% mirror smoothness (i.e., surface roughness of zero), contrary to a portion of the surface of the subject which is mounted on a conventionally used rotary table for rotation of the subject about the above-indicated portion while this portion is irradiated by one of the linearly polarized beams. That is, the instant measuring apparatus permits easy and accurate measurement of surface roughness of the subject.

Further, the use of the X-Y table 42 movable in a two-dimensional or two-axis coordinate system, in place of the conventionally used rotary table, makes it possible to facilitate data processing for data display of values in a three-dimensional coordinate system.

In the present embodiment wherein the comparatively large reading spot P1 is irradiated by the P-type linearly polarized beam, the amounts of influences of surface rougness in the local areas of the reading spot P1 on the reflected P-type beam are averaged, whereby the reflected P-type beam is influenced only by the Doppler frequency shift Δfd caused by the disturbances. This frequency shift Δfd of the P-type beam is counterbalanced by the same Doppler frequency shift Δfd of the S-type beam reflected by the reading spot S1. Thus, the measuring accuracy of the instant apparatus is improved.

The present optical surface roughness measuring apparatus is suitable particularly for detecting or inspecting circumferential grooves or projections formed on a subject, such as a magnetooptical data storage disk.

It will be understood that desired changes and modifications may be made in the embodiment which has been described.

For example, the Zeeman-type laser source 10 used as a laser device for producing two mutually perpendicular polariaztion planes and different frequencies may be replaced by a laser device which uses an acoustooptical element or other frequency shifter, for producing two linearly polarized laser beams which have a suitable difference in frequency.

Each of the optical elements such as converging lenses, mirrors and beam splitters, used in the above embodiment, may be replaced by other functionally equivalent element or elements.

Although the subject 32 is movable in both X-axis and Y-axis directions while being mounted on the X-Y table 42, the subject may be mounted on a table which is moved in the X-axis direction only.

Further, the reference photosensor 14 and/or measuring photosensor 44 may be provided with a polarizing plate which has an optical axis inclined about 45 degrees with respect to the polarization plane of the P-type or S-type linearly polarized beam. In this case, the optical intensities of the P-type and S-type beams incident upon the photosensors 14, 44 may be changed relative to each other, by changing the angle of inclination of the axis of the polarizing plate or plates.

Figure 2:
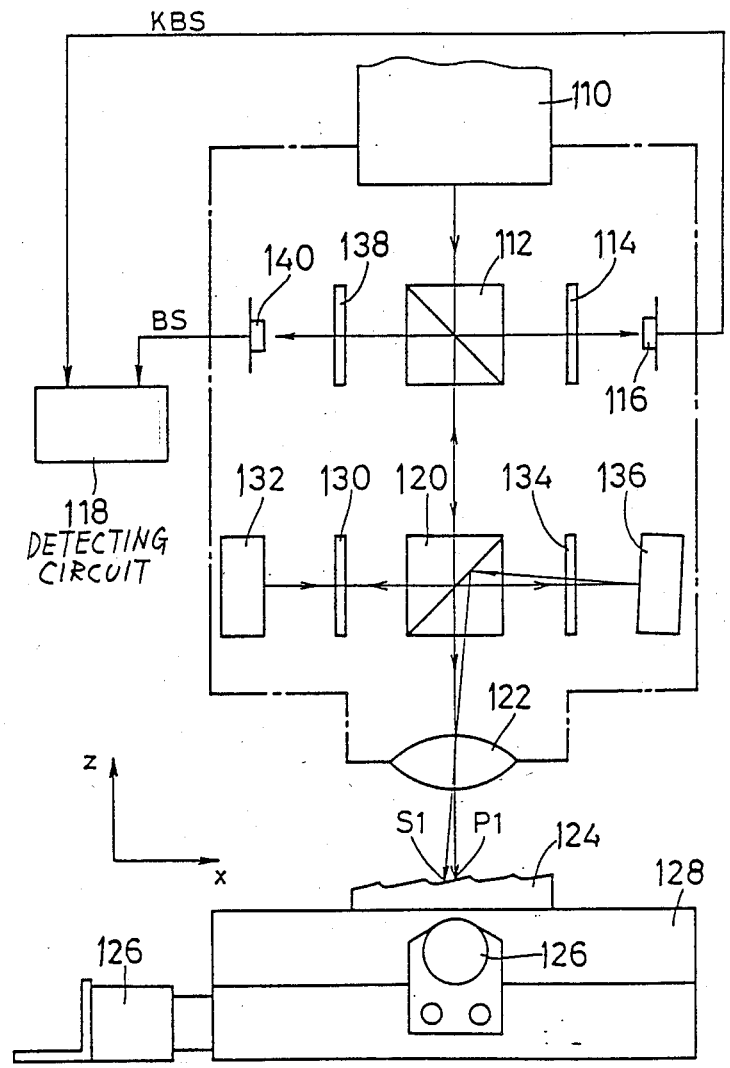
FIG. 2 is a schematic view of another embodiment of the invention.

Referring next to FIG. 2, there is illustrated a second embodiment of the present invention, wherein reference numeral 110 designates a laser device in the form of an He-Ne laser source similar to the laser source 10 used in the first embodiment of FIG. 1. A component of each of the S-type and P-type linearly polarized laser beams is transmitted through a non-polarizing beam splitter 112, while the other component of each laser beam is reflected by the same beam splitter 112 and received by a reference photosensor 116 through a polarizing plate 114. The reference photosensor 116 produces a reference beat signal KBS having a reference beat frequency (fs−fp), which is applied to a detecting circuit 118.

The S-type and P-type linearly polarized laser beams which have been transmitted through the non-polarizing beam splitter 112 are split by a polarizing beam splitter 120, such that the P-type laser beam having the polarization plane parallel to the plane of incidence of the beam splitter 120 is transmitted therethrough, while the S-type laser beam having the polarization plane perpendicular to the plane of incidence is reflected, in a direction perpendicular to the direction of incidence. The P-type laser beam transmitted through the polarizing beam splitter 120 is converged by a convering lens device 122 on the surface of a subject 124. This subject 124 is mounted on an X-Y table 128 which is moved by a drive device 126 along the X and Y axes.

The S-type laser beam reflected by the polarizing beam splitter 120 is incident upon a mirror 132 through a ¼ waveplate 130, and is reflected by the mirror 132 and transmitted through the ¼ waveplate 130. As a result, the polarization plane of the S-type laser beam which has been transmitted through the ¼ waveplate 130 the second time is rotated by 90 degrees, whereby the S-type laser beam is converted into a P-type laser beam. This P-type laser beam is then transmitted through the beam splitter 120 and another ¼ waveplate 134, and reflected by another mirror 136 and transmitted again through the ¼ waveplate 134. As a result, the polarization plane of the P-type laser beam which has been transmitted through the ¼ waveplate 134 the second time is converted back into the S-type laser beam, which is reflected by the beam splitter 120 and coverged by the converging lens device 122 on the surface of the subject 124.

The P-type laser beam is focused or converged at a point of convergence P1, while the S-type laser beam is focused at a point of convergence S1 which is spaced a suitable small distance, for example, a few microns, away from the point of convergence P1. Described in detail, the mirror 136 is inclined with respect to its optical axis (parallel to the direction of propagation of the laser beam), by a small angle, so that the direction of incidence of the S-type laser beam upon the converging lens device 122 is slightly inclined with that of the P-type laser beam.

It will be understood from the above description that the ¼ waveplate 130, mirror 132, ¼ waveplate 134 and mirror 136 constitute optical means for causing the S-type laser beam reflected by the polarizing beam splitter 120 in a direction deviating from the optical path between the laser source 110 and the converging lens device 122, to be again incident upon the polarizing beam splitter 120 such that the S-type laser beam again reflected by the beam splitter 120 is converged by the converging lens device 122 on the surface of the subject 124, such that the direction of incidence of the S-type laser beam upon the converging lens device 122 is inclined by a suitable small angle with respect to that of the P-type laser beam, so that the point of convergence of the S-type laser beam is spaced by an extremely small distance away from the point of convergence P1 of the P-type laser beam.

The P-type and S-type linearly polarized laser beams reflected from the points of convergence P1 and S1 are returned to the non-polarizing beam splitter 112 in the reverse direction, along the same optical paths described above. The laser beams are reflected by the beam splitter 112 and received by a measuring photosensor 140 via a polarizing plate 138. The measuring photosensor 140 produces a measuring beat signal BS having a beat frequency of the P-type and S-type linearly polarized beams reflected from the points of convergence P1, S1. The measuring beat signal BS is applied to the detecting circuit 118. The polarizing plates 114, 138 have optical axes which are inclined about 45 degrees with respect to the polarization planes of the P-type and S-type laser beams. The optical intensities of the P-type and S-type laser beams incident upon the reference and measuring photosensors 116, 140 may be changed relative to each other, by changing the angles of inclination of the optical axes of the polarizing plates 114, 138.

Suppose the nominal frequencies of the S-type and P-type laser beams as produced by the laser source 110 are represented by fs and fp, respectively, the reference beat frequency fB represented by the reference beat signal KBS is equal to (fs−fp), while the measuring beat frequency fD represented by the measuring beat signal BS is equal to [fs−fp+($\Delta$fs−$\Delta$fp)], where the frequency shifts of the reflected P-type and S-type laser beams from the subject 124 are equal to $\Delta$fp and $\Delta$fs, respectively.

Figure 3:
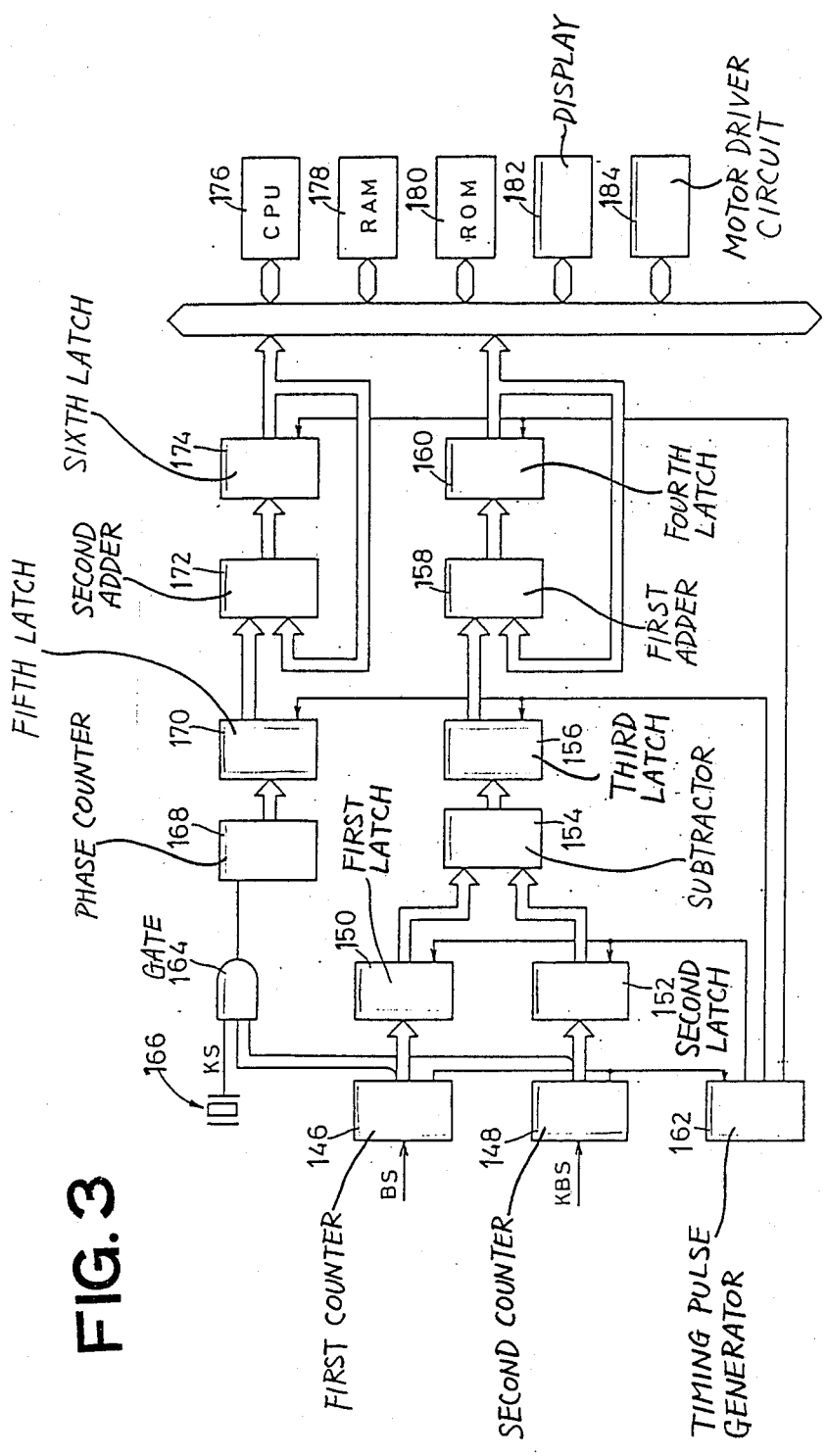
FIG. 3 is a schematic view showing a detecting circuit of the measuring apparatus of FIG. 2.

Referring to FIG. 3, there is illustrated in detail the detecting circuit 118. The reference and measuring beat signals BS, KBS are amplified and shaped into pulses having a rectangular waveform. These pulse signals BS, KBS are applied to respective first and second counters 146, 148, so that a count Cp of the measuring beat pulse signal BS having the frequency fD is obtained by the first counter 146, while a count Cs of the reference beat pulse signal KBS having the frequency fB is obtained by the second counter 148. After a predetermined counting period has elapsed, the obtained counts Cp, Cs of the first and second counters 146, 148 are temporarily stored in respective first and second latches 150, 152. Then, a difference (Cp−Cs) is obtained by a subtractor 154, and is temporarily stored in a third latch 156. The difference (Cp−Cs) corresponds to fD−fB (=$\Delta$fs−$\Delta$fp).

The output of the third latch 156 is applied to a first adder 158, and the output of the first adder 158 is temporarily stored in a fourth latch 160. The first adder 158 is adapted to add the present output (Cp−Cs) of the third latch 156 to the present output of the fourth latch 160, each time the fourth latch 160 receives a timing pulse generated by a timing pulse generator 162. In this arrangement, the fourth latch 160 stores a sum of a predetermined number of the output values of the difference (Cp−Cs) from the third latch 156, i.e., $\Sigma[(Cp-Cs)]_k$, where k=predetermined number of the output values of the third latch 156. The timing pulse generator 162 is controlled by a CPU 176 (central processing unit which will be described), and sequentially generates various timing pulses. These timing pulses include the timing pulse applied to the fourth latch 160 described above, timing pulses for storing the counts Cp, Cs of the first and second counters 146, 148 upon expiration of the predetermined counting period (at which the counters are cleared), and a timing pulse for storing the difference (Cp−Cs) in the third latch 156.

A reference pulse generator 166 produces reference pulses KS having a predetermined clock frequency. The reference pulses KS are applied through a gate 164 to a phase counter 168, and counted by the phase counter 168 for a given counting period equivalent to a difference between count timings of the first and second counters 146, 148. Namely, the gate 164 is open for a period, for example, between the moments at which the first and second counters 146, 148 start counting. The frequency of the reference pulses KS is 100 MHz, for instance. In this case, a count $C_I$ of the phase counter 168 represents a phase difference between the measuring and reference beat signals BS, KBS, that is, a Z-axis distance between the points of convergence P1 and S1 on the surface of the subject 124, which distance is smaller than a half ($\lambda$/2) of the wavelength of the laser beams produced by the laser source 110.

The count $C_I$ of the phase counter 168 is temporarily stored in a fifth latch 170, and applied to a second adder 172. The output of this adder 172 is applied to a six latch 174, and the output of the sixth latch 174 is applied to the second adder 172. Thus, the second adder 172 is adapted to add the present output ($C_I$) of the fifth latch 170 to the present output of the sixth latch 174, each time the sixth latch 174 receives a timing pulse generated by the timing pulse generator 162. In this arrangement, the sixth latch 174 stores a sum of a predetermined number of the output values from the fifth latch 170, i.e., $\Sigma[C_I]_k$, where k=predetermined number of the output values of the fifth latch 170.

The CPU 176 operates to process the output signals of the fourth and sixth latches 160, 174 according to a control program stored in a ROM (read-only memory) 180, while utilizing a temporary data storage function of a RAM (random-access memory) 178. More specifically, the CPU 176 continuously calculates the Z-axis distance between the points of convergence P1 and S1, to thereby continuously measure the surface roughness of the subject 124, while controlling a motor driver circuit 184 to operate the X-Y table 128 so that the X-Y table is moved along a predetermined path at a predetermined speed.

Figure 4:
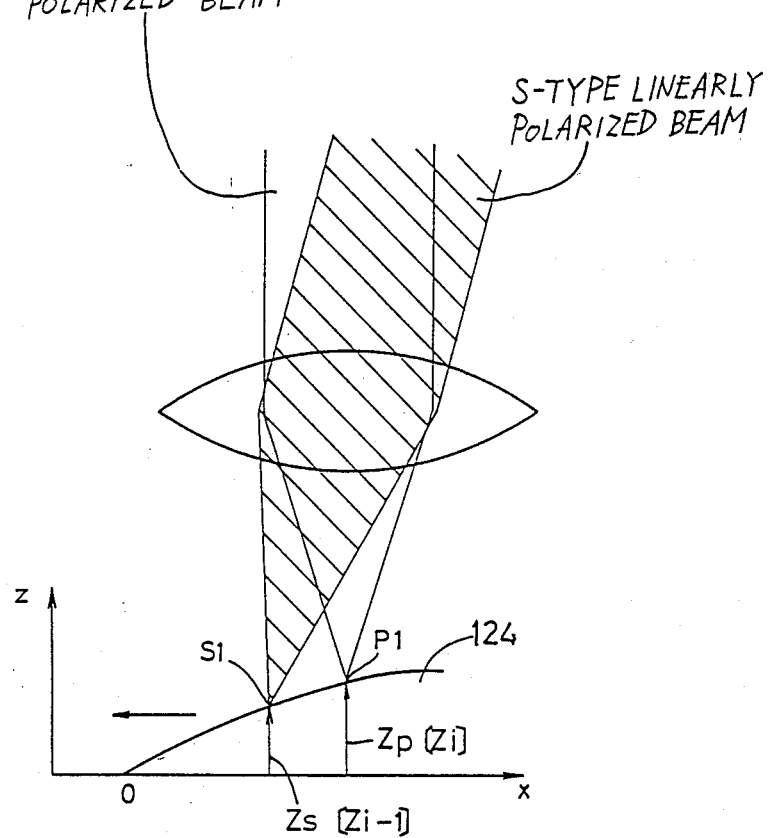
FIG. 4 is an illustrating explaining an operation of the detecting circuit of FIG. 3.

Suppose amounts of displacements of the surface of the subject 124 in the Z-axis direction at the points of convergence P1 and S1 when the subject 124 is moved in the X-Y plane are represented by $\Delta$Zp and $\Delta$Zs, respectively, as indicated in FIG. 4, the amounts of frequency shifts $\Delta$fp and $\Delta$fs of the P-type and S-type linearly polarized laser beams are represented by the following equations (4) and (5), according to the basic formula of the Doppler effect:

$$fp = (2/\lambda) \cdot (\Delta Zp/\Delta t) \qquad (4)$$

$$fs = (2/\lambda) \cdot (\Delta Zs/\Delta t) \quad (5)$$

The amounts of displacements Zp, Zs are represented by the following equations (6) and (7), by integrating the above two equations (4) and (5):

$$Zp = (\lambda/2) \int \Delta fp \, dt \quad (6)$$

$$Zs = (\lambda/2) \int \Delta fs \, dt \quad (7)$$

Since the Z-axis distance between the points of convergence P1 and S1 is equal to a difference between the amounts of displacements Zp and Zs, the distance is obtained by the following equation (8):

$$Zp - Zs = (\lambda/2) \cdot [Cp - Cs] \quad (8)$$

While the points of convergence P1 and S1 are moved with the movement of the subject 24, the values Zp and Zs are respectively replaced by $Z_i$ and $Z_{i-1}$. Therefore, the equation (8) is converted into the following equation (9):

$$Z_i = (\lambda/2) \cdot [Cp - Cs] + Z_{i-1} \quad (9)$$

Hence, a relationship expressed by the following equation (10) exits between the amount of displacement Z and the counts Cp, Cs of the counters 146, 148:

$$Z = \Sigma(\lambda/2) \cdot [Cp - Cs]_k + Zo \quad (10)$$

The CPU 176 calculates the surface roughness of the subject 124, in increments of $\lambda/2$, based on the output $\Sigma[Cp - Cs]_k$ of the fourth latch 160, and according to the above equation (10).

In the meantime, the CPU 176 calculates, based on the output $\Sigma[C_f]_k$ of the sixth latch 174, the displacement of the surface of the subject 124 which is smaller than the half ($\lambda/2$) of the wavelength of the laser beams. Since the output $\Sigma[C_f]_k$ of the sixth latch 174 is an integrated value of the count of the reference pulses KS having 100 MHz, for a time duration corresponding to the phase difference between the measuring and reference beat signals, the surface roughness represented by the phase difference may be measured with a resolution or in increments of $\lambda/2000$, where the basic frequency (fp−fs) of the measuring beat signal BS is 100 KHz.

The displacements in increments of $\lambda/2$, and the displacements in increments corresponding to the phase difference, which are calculated as described above, are alternately added to eventually obtain amounts of displacement which represent the surface roughness of the subject 124, and the thus detected surface roughness values are indicated on a display 182.

It follows from the foregoing description of the second embodiment that the S-type and P-type linearly polarized laser beams having mutually perpendicular polarization planes and different frequencies are converged at the points S1 and P1 on the surface of the subject 124, without using a Wollaston polarizing prism for splitting two linearly polarized beams having mutually perpendicular polarization planes and different frequencies. Therefore, optical surface roughness measuring apparatus of the present second embodiment offers the same advantages as the first embodiment, which have been described.

Figure 5:
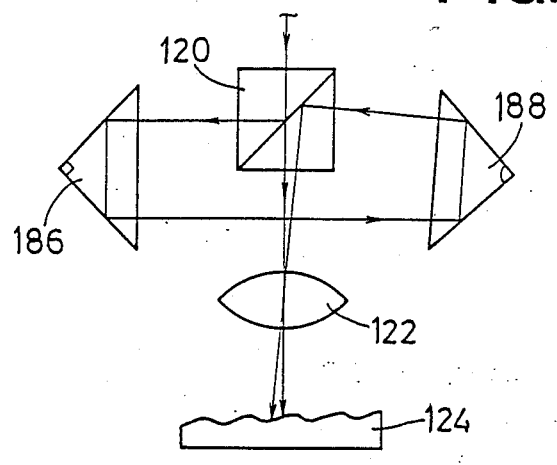
FIGS. 5 and 6 are fragmentary schematic views of further embodiments of the invention.

A modified arrangement of the second embodiment is shown in FIG. 5, wherein the S-type linearly polarized laser beam which is incident upon the polarizing beam splitter 120 is reflected by the same beam splitter 120.

The reflected S-type laser beam is reflected by a rectangular prism 186, and incident upon a suitably shaped prism 188 whose reflector surfaces form an angle so that the laser beam reflected by the shaped prism 188 is again incident upon the polarizing beam splitter 120. The S-type laser beam is reflected by the beam splitter 120, and is incident upon the converging lens device 122 such that the direction of incidence is inclined a predetermined small angle with respect to that of the P-type laser beam, so that the point of convergence S1 is spaced by an extremely small distance away from the point of convergence P1 of the P-type laser beam, as in the second embodiment of FIG. 2. Thus, the rectangular prism 186 and the shaped prism 188 constitute optical means for inclining the direction of incidence of the S-type laser beam upon the converging lens device 122, relative to that of the P-type laser beam, as described above.

Figure 6:
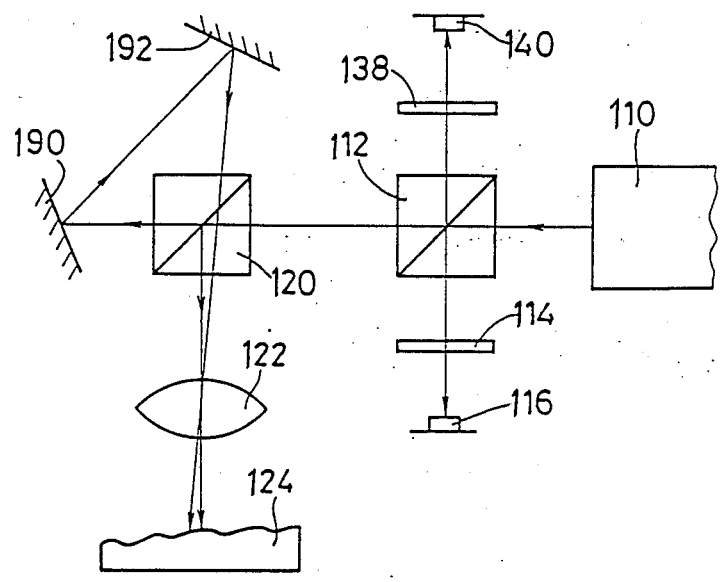

Another modified arrangement of the second embodiment is illustrated in FIG. 6, wherein the S-type laser beam reflected by the polarizing beam splitter 120 is incident upon the converging lens device 122, while the P-type laser beam transmitted through the beam splitter 120 is reflected by a pair of mirrors 190, 192 and is incident upon the converging lens device 122 in a direction slightly inclined with respect to the S-type laser beam. In this arrangement, the mirrors 190, 192 serve as optical means for inclining the direction of incidence of the P-type laser beam upon the converging lens device 122, relative to that of the S-type laser beam, so that the P-type laser beam is converged at the point P1 which is spaced by an extremely small distance away from the point of convergence S1.

While the present invention has been described in its presently preferred embodiments, it is to be understood that the invention is not limited to the precise details of the illustrated embodiments and the illustrated modified arrangement, but the invention may be embodied with various other changes, modifications and improvements, which may occur to those skilled in the art, without departing from the spirit and scope of the invention defined in the following claims.

What is claimed is:

1. An optical surface roughness measuring device for measuring roughness of a surface of a subject in a non-contacting manner, by irradiating said surface with two linearly polarized beams of light which have mutually perpendicular polarization planes and different frequencies, and detecting a change in a beat frequency of said two beams reflected by said surface, comprising:

a laser device for producing two linearly polarized laser beams as said two linearly polarized beams; and an optical device receiving said two linearly polarized beams, converging one of said two laser beams so as to irradiate a first reading spot on the surface of said subject, converting the other of said two laser beams into parallel rays of light, and irradiating a second reading spot on said surface with said parallel rays of light of said other laser beam, such that said second reading spot is aligned with said first reading spot and has a diameter sufficiently larger than that of said first reading spot.

2. An optical surface roughness measuring apparatus according to claim 1, wherein said laser device comprises an He-Ne laser source which produces two laser beams having mutually perpendicular planes of wave vibrations and different frequencies.

3. An optical surface roughness measuring apparatus according to claim 1, wherein said optical device includes: a first polarizing laser beam splitter for separating said two laser beams from each other; first converging lens means for converting said one of said two laser beam into parallel rays of light; second converging lens means for converging said other laser beam; a second polarizing laser beam splitter receiving said parallel rays of light of said one laser beam and the converged other laser beam; and an objective lens for converging said parallel rays of light of said one laser beam so as to irradiate said first reading spot, and converting said converged other laser beam into parallel rays of light so as to irradiate said second reading spot.

4. An optical surface roughness measuring apparatus according to claim 1, further comprising: a reference photosensor receiving said two linearly polarized laser beams from said laser device, and producing a reference beat signal; a measuring photosensor receiving said two laser beams reflected by said surface of the subject, and producing a measuring beat signal; and a detecting circuit receiving said reference and measuring beat signals, and calculating said roughness of the subject based on the received beat signals.

5. An optical surface roughness measuring apparatus according to claim 4, wherein said detecting circuit calculates a first amount of displacement of said surface of the subject at said first reading spot during a movement of said subject in a direction perpendicular to a direction of said displacement, based on a difference between counts of pulses of said reference and measuring beat signals, said first amount being measured in increments of a half of a wavelength of the frequencies of said laser beams, said detecting circuit further calculating a second amount of displacement of said surface during said movement, based on a count of clock pulses for a time duration corresponding to a phase difference between said reference and measuring beat signals, said second amount of displacement being measured in increments of not larger than said half of said wavelength, said detecting circuit adding said first and second amounts of displacement, and eventually determining said roughness of the surface of said subject, based on a sum of said first and second amounts.

6. An optical surface roughness measuring apparatus according to claim 5, further comprising an X-Y table for moving said subject in an X-Y plane relative to said optical device, said first and second displacements occurring in a Z-axis direction perpendicular to said X-Y plane.

7. An optical surface roughness measuring apparatus for measuring roughness of a surface of a subject in a non-contacting manner, by irradiating said surface with two linearly polarized beams of light which have mutually perpendicular polarization planes and different frequencies, and detecting a change in a beat frequency of said two beams reflected by said surface, comprising:
a laser device for producing two linearly polarized laser beams as said two linearly polarized beams;
a converging lens device for converging said two laser beams at a first and a second point of convergence on said surface of said subject;
a polarizing beam splitter disposed between an optical path between said laser device and said converging lens device, and having a reflector surface which permits transmission therethrough of a linearly polarized beam having a polarization plane parallel to a plane of incidence thereof, and which reflects a linearly polarized beam having a polarization plane perpendicular to said plane of incidence, said polarizing beam splitter causing one of said two laser beams to be incident upon said converging lens device and converged by the converging lens device at said first point of convergence, said polarizing beam splitter causing the other of said two laser beams to deviate from said optical path; and
optical means for causing said other laser beam which has deviated from said optical path, to be again incident upon said polarizing beam splitter and emitted from the beam splitter such that said other laser beam is incident upon said converging lens device and thereby converged at said second point of convergence, such that a direction of incidence of said other laser beam upon said converging lens device is inclined by a predetermined angle with respect to that of said one laser beam, so that said second point of convergence is spaced by a small distance away from said first point of convergence.

8. An optical surface roughness measuring apparatus according to claim 7, wherein said laser device comprises an He-Ne laser source which produces two laser beams having mutually perpendicular planes of wave vibrations and different frequencies.

9. An optical surface roughness measuring apparatus according to claim 7, wherein said optical means comprises: a first mirror reflecting said other laser beam reflected from said polarizing beam splitter, in a direction toward said beam splitter; a first ¼ waveplate disposed between said beam splitter and said first mirror, for rotating the polarization plane of said other laser beam to be rotated by 90 degrees, so that said other laser beam can be transmitted through said beam splitter; a second mirror for reflecting said other laser beam transmitted through said beam splitter, in a direction toward said beam splitter; a second ¼ waveplate disposed between said beam splitter and said second mirror, for rotating the polarization plane of said other laser beam by 90 degrees, so that said other laser beam can be reflected by said beam splitter, and wherein said second mirror is inclined relative to said optical path so that said direction of incidence of said other laser beam upon said converging lens device is inclined by said predetermined angle with respect to that of said one laser beam.

10. An optical surface roughness measuring device according to claim 7, wherein said optical means comprises a first rectangular prism for reflecting said other laser beam from said polarizing beam splitter, in a direction parallel to a direction in which said other laser beam was reflected by said beam splitter toward said first rectangular prism, and a second rectangular prism for reflecting sait other laser beam reflected from said first rectangular prism, in a direction toward said beam splitter, and wherein said second rectangular prism is inclined relative to said optical path so that said direction of incidence of said other laser beam upon said converging lens device is inclined by said predetermined angle with respect to that of said one laser beam.

11. An optical surface roughness measuring device according to claim 7, wherein said optical means comprises a first mirror for reflecting said other laser beam transmitted through said polarizing beam splitter away from said optical path, and a second mirror for reflecting said other laser beam reflected from said first mirror, so that said other laser beam is transmitted through said beam splitter and incident upon said converging lens device so that said direction of incidence of said other laser beam upon said converging lens device is inclined by said predetermined angle with respect to that of said one laser beam.

12. An optical surface roughness measuring device according to claim 7, further comprising: a reference photosensor receiving said two linearly polarized laser beams from said laser device, and producing a reference beat signal; a measuring photosensor receiving said two laser beams reflected by said surface of the subject, and producing a measuring beat signal; and a detecting circuit receiving said reference and measuring beat signals, and calculating said roughness of the subject based on the received beat signals.

13. An optical surface roughness measuring apparatus according to claim 12, wherein said detecting circuit calculates a first amount of displacement of said surface of the subject at said first reading spot during a movement of said subject in a direction perpendicular to a direction of said displacement, based on a difference between counts of pulses of said reference and measuring beat signals, said first amount being measured in increments of a half of a wavelength of the frequencies of said laser beams, said detecting circuit further calculating a second amount of displacement of said surface during said movement, based on a count of clock pulses for a time duration corresponding to a phase difference between said reference and measuring beat signals, said second amount of displacement being measured in increments of not larger than said half of said wavelength, said detecting circuit adding said first and second amounts of displacement, and eventually determining said roughness of the surface of said subject, based on a sum of said first and second amounts.

14. An optical surface roughness measuring apparatus according to claim 13, further comprising an X-Y table for moving said subject in an X-Y plane relative to said optical device, said first and second displacements occurring in a Z-axis direction perpendicular to said X-Y plane.

* * * * *